US012679482B2

(12) United States Patent
Edwards et al.

(10) Patent No.: US 12,679,482 B2
(45) Date of Patent: Jul. 14, 2026

(54) TUNNEL AND BATTERY STRUCTURE FOR A SNOW VEHICLE

(71) Applicant: Polaris Industries Inc., Medina, MN (US)

(72) Inventors: Benjamin Edwards, North Branch, MN (US); Barry Johnson, Roseau, MN (US); Peter Kern, Greenbush, MN (US); Cory Huot, Little Canada, MN (US); Lindsay Edwards, Roseau, MN (US); Virendra Gupta, Roseau, MN (US); Dustin Mertens, Roseau, MN (US); Michael A. Hedlund, Roseau, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 349 days.

(21) Appl. No.: 18/410,486

(22) Filed: Jan. 11, 2024

(65) Prior Publication Data

US 2024/0253714 A1    Aug. 1, 2024

Related U.S. Application Data

(60) Provisional application No. 63/441,469, filed on Jan. 27, 2023.

(51) Int. Cl.
*B62D 55/07*        (2006.01)
*B60L 50/60*        (2019.01)

(52) U.S. Cl.
CPC .............. *B62D 55/07* (2013.01); *B60L 50/66* (2019.02)

(58) Field of Classification Search
CPC ................................ B62D 55/07; B60L 50/66
See application file for complete search history.

(56) References Cited

U.S. PATENT DOCUMENTS

| | | | | |
|---|---|---|---|---|
| 8,381,857 | B1 * | 2/2013 | Sampson | ............... B62M 27/02 |
| | | | | 280/21.1 |
| 11,214,320 | B2 * | 1/2022 | Bates, Jr. | ............... B62D 55/07 |
| 11,358,661 | B2 * | 6/2022 | Laugen | .................. B62D 55/10 |
| 12,300,839 | B2 * | 5/2025 | Connors | .................. B60K 1/00 |
| 2022/0212754 | A1 * | 7/2022 | Stock | ..................... B62M 27/02 |
| 2025/0065985 | A1 * | 2/2025 | Salfer | ..................... B62J 43/16 |

* cited by examiner

*Primary Examiner* — Faye M Fleming
(74) *Attorney, Agent, or Firm* — Merchant & Gould P.C.

(57)        ABSTRACT

A tunnel and battery box assembly for a snow vehicle includes a tunnel covering at least a portion of an endless track. The tunnel also includes a first heat exchanger coupled to the first sidewall; a second heat exchanger coupled to the second sidewall, a fuel tank, a first thermal cover coupled to the first heat exchanger between the first heat exchanger and the fuel tank, a first insulating layer disposed on an upper surface of the first thermal cover, a second thermal cover coupled to the second heat exchanger between the second heat exchanger and the fuel tank, and a second insulating layer disposed on an upper surface of the second thermal cover. The vehicle may also include a battery box structure having a battery receiver receiving the battery, and a fuel tank mount integrally formed in the battery box structure coupling the battery box to fuel tank.

29 Claims, 19 Drawing Sheets

TUNNEL AND BATTERY STRUCTURE FOR A SNOW VEHICLE

CROSS-REFERENCE TO RELATED APPLICATION

This application claims the benefit of U.S. Provisional Application No. 63/441,469, filed on Jan. 27, 2023. The entire disclosure of the above application is incorporated herein by reference.

FIELD

The present disclosure relates to a tunnel that partially covers a track of a tracked vehicle and, more particularly, to a tunnel that has a thermal shield and a battery box configuration for use on a tracked vehicle, such as a snowmobile.

BACKGROUND

This section provides background information related to the present disclosure which is not necessarily prior art.

Tracked vehicles, such as snowmobiles or snow bikes, generally include one front ski or a pair of front skis for steering and a rear endless track for driving or propelling the snowmobile. A chassis, or body, of the snowmobile includes a tunnel that is positioned over the track to support a seat and prevent snow from hitting the snowmobile occupants.

Tracked vehicles include a fuel tank, battery and wires to and from the battery. Maintaining the fuel tank at the lowest temperature increases the performance of the vehicle. Preventing the fuel tank from being exposed to high temperatures is important.

The components mentioned above are typically coupled together with a significant number of number of components, which in turn require a significant amount of assembly time. Reducing the amount of assembly time and the number of components can reduce the cost of the vehicle.

Other components include an insulating layer or pad used to isolate heat from the heat exchangers found within the tunnel. In many conditions the thermal performance of the pads and surrounding assembly could be increased.

SUMMARY

This section provides a general summary of the disclosure, and is not a comprehensive disclosure of its full scope or all of its features.

One general aspect includes a tunnel covering at least a portion of an endless track. The tunnel also includes a first heat exchanger coupled to the first sidewall; a second heat exchanger coupled to the second sidewall, a fuel tank, a first thermal cover coupled to the first heat exchanger between the first heat exchanger and the fuel tank, a first insulating layer disposed on an upper surface of the first thermal cover, a second thermal cover coupled to the second heat exchanger between the second heat exchanger and the fuel tank, and a second insulating layer disposed on an upper surface of the second thermal cover.

Implementations may include one or more of the following features. The vehicle where the first thermal cover and the second thermal cover are rigid. The first heat exchanger may include a first t-slot therein and the second heat exchanger may include a second t-slot therein. The first t-slot is disposed in an upper-facing edge of the first heat exchanger and where the second t-slot is disposed in an upper-facing edge of the second heat exchanger. A lower surface of the first thermal cover may include a first t-extension received within the first t-slot and a lower surface of the second thermal cover may include a second t-extension received within the second t-slot. The first thermal cover may include an inside edge may include a first discontinuous area portion and the second thermal cover may include a second discontinuous area portion, where the first discontinuous area portion and the second discontinuous area portion are sized to receive at least a portion of a battery box structure, said battery box structure coupled to and between the first sidewall and the second sidewall. The vehicle may include a wire clip integrally formed in the upper surface of the first thermal cover. The wire clip may include an electrical wire coupled thereto, and where the fuel tank may include a lower surface may include a longitudinally extending channel receiving the electrical wire at least partially therein. The first thermal cover may include a first rearward end may include a first fastener receiver and the second thermal cover may include a second rearward end may include a second fastener receiver, and may include a first fastener coupling the first rearward end and a tunnel cover to the first heat exchanger and a second fastener coupling the second rearward end and the tunnel cover to the second heat exchanger.

One general aspect includes a vehicle having a battery may include. The vehicle also includes a tunnel covering at least a portion of an endless track, said tunnel may include a first sidewall and a second sidewall extending longitudinally relative to the vehicle; a fuel tank, a battery box structure coupled between the first sidewall and the second sidewall may include a battery receiver receiving the battery therein, and a fuel tank mount integrally formed in the battery box structure coupling the battery box to fuel tank.

Implementations may include one or more of the following features. The vehicle may include a first heat exchanger coupled to the first sidewall, a second heat exchanger coupled to the second sidewall and where the battery box structure is coupled to the first sidewall and the second sidewall by the first heat exchanger and second heat exchanger. The battery box structure may include a base extending outward from the battery receiver coupled to the first heat exchanger and the second heat exchanger. Said fuel tank may include a flange coupled to the fuel tank mount. The fuel tank mount may include a first fuel tank mount and a second fuel tank mount, where the flange may include a first flange coupled to the first fuel tank mount and a second flange coupled to the second fuel tank mount. The vehicle may include a solenoid mount integrally formed into the battery box, said solenoid mount receiving a solenoid therein. The solenoid mount extends from a longitudinally extending wall of the battery receiver. The vehicle may include a fuse box receiver is integrally formed in the battery box structure. The fuse box receiver is integrally formed with the battery receiver. The fuel tank has retainer posts extending therefrom, said retainer posts and said seat support coupling a seat to the tunnel. The vehicle may include a port coupled to the seat support panel. The battery box structure may include flanges extending beneath and fastened to the rear tunnel cover. The battery box structure may include an accessory receiver port integrally formed therein.

One general aspect includes a vehicle may include a battery may include. The vehicle also includes a tunnel covering at least a portion of an endless track, said tunnel may include a first sidewall and a second sidewall extending longitudinally relative to the vehicle; a first heat exchanger coupled to the first sidewall; a second heat exchanger coupled to the second sidewall. The fuel tank incudes a fuel tank, a first thermal cover coupled to the first heat exchanger between the first heat exchanger and the fuel tank, a first insulating layer disposed on an upper surface of the first thermal cover, a second thermal cover coupled to the second heat exchanger between the second heat exchanger The vehicle may include a surface of the second thermal cover, a battery box structure coupled to the first heat exchanger and the second heat exchanger between the first sidewall and the second sidewall, said battery box structure comprising a battery receiver receiving the battery therein and a fuel tank mount integrally formed in the battery box structure coupling the battery box to fuel tank.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
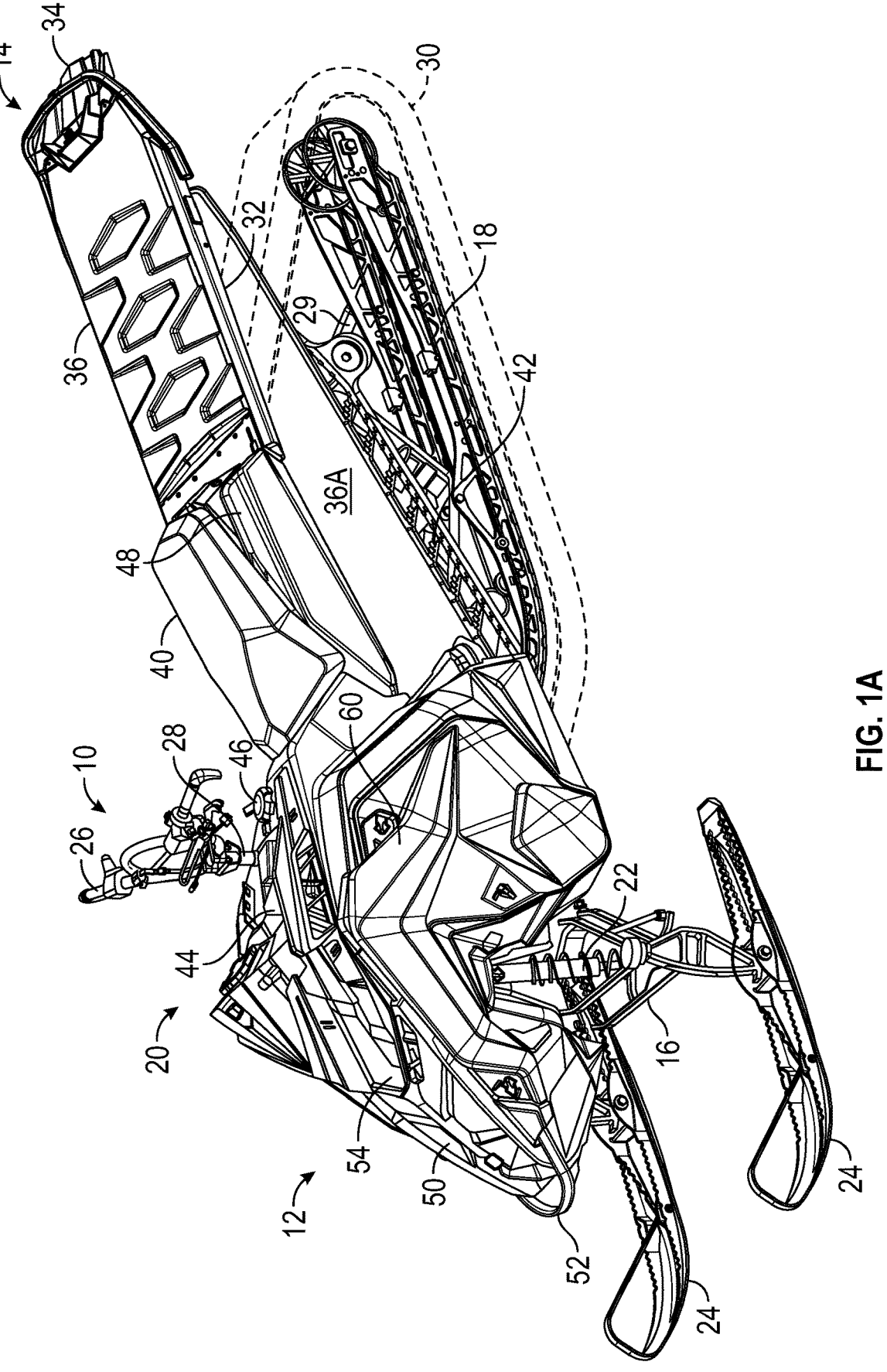
FIG. 1A is a perspective view of an exemplary snowmobile in accordance with the present disclosure.
Figure 1B:
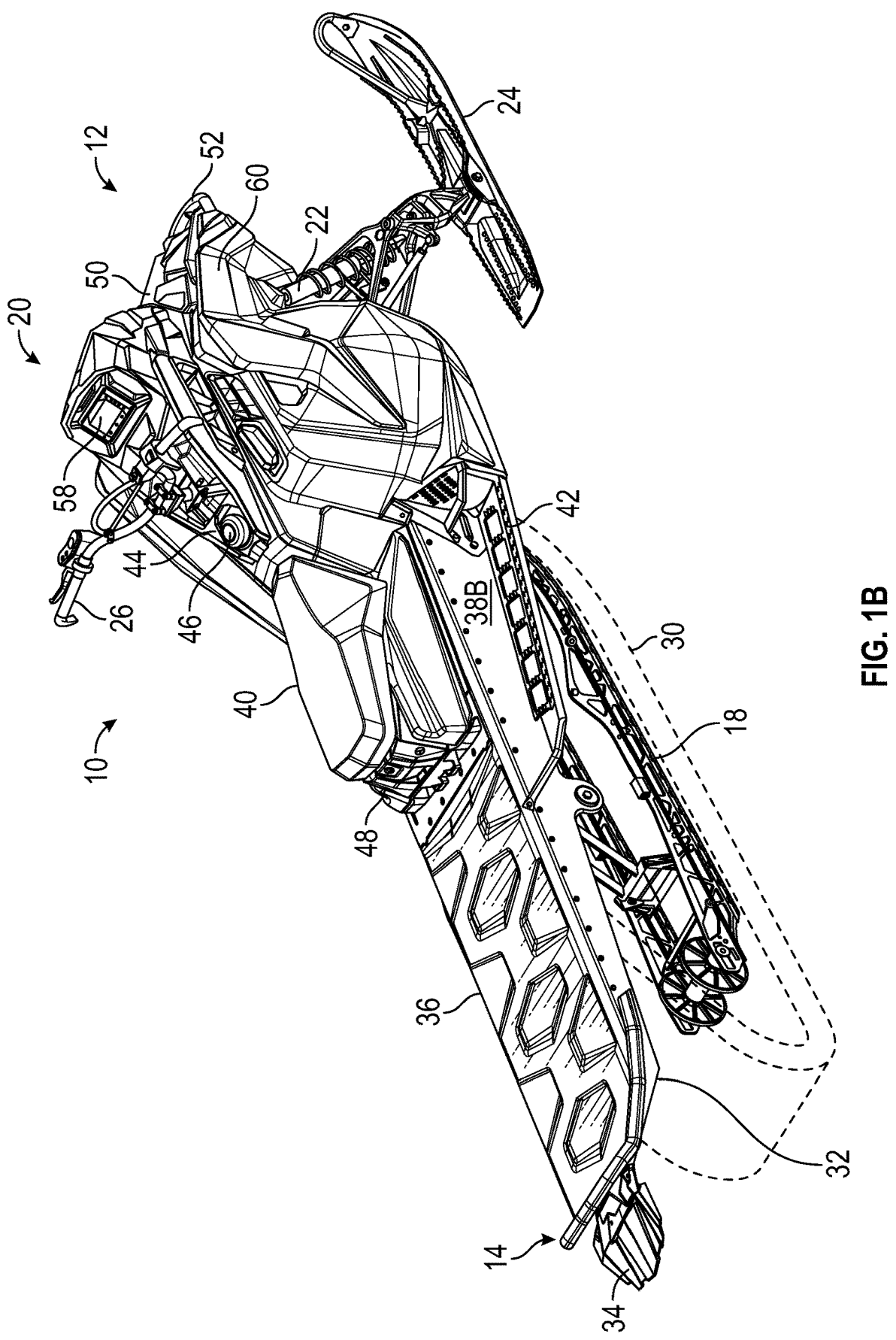
FIG. 1B is another perspective view of the snowmobile of FIG. 1A.
Figure 1C:
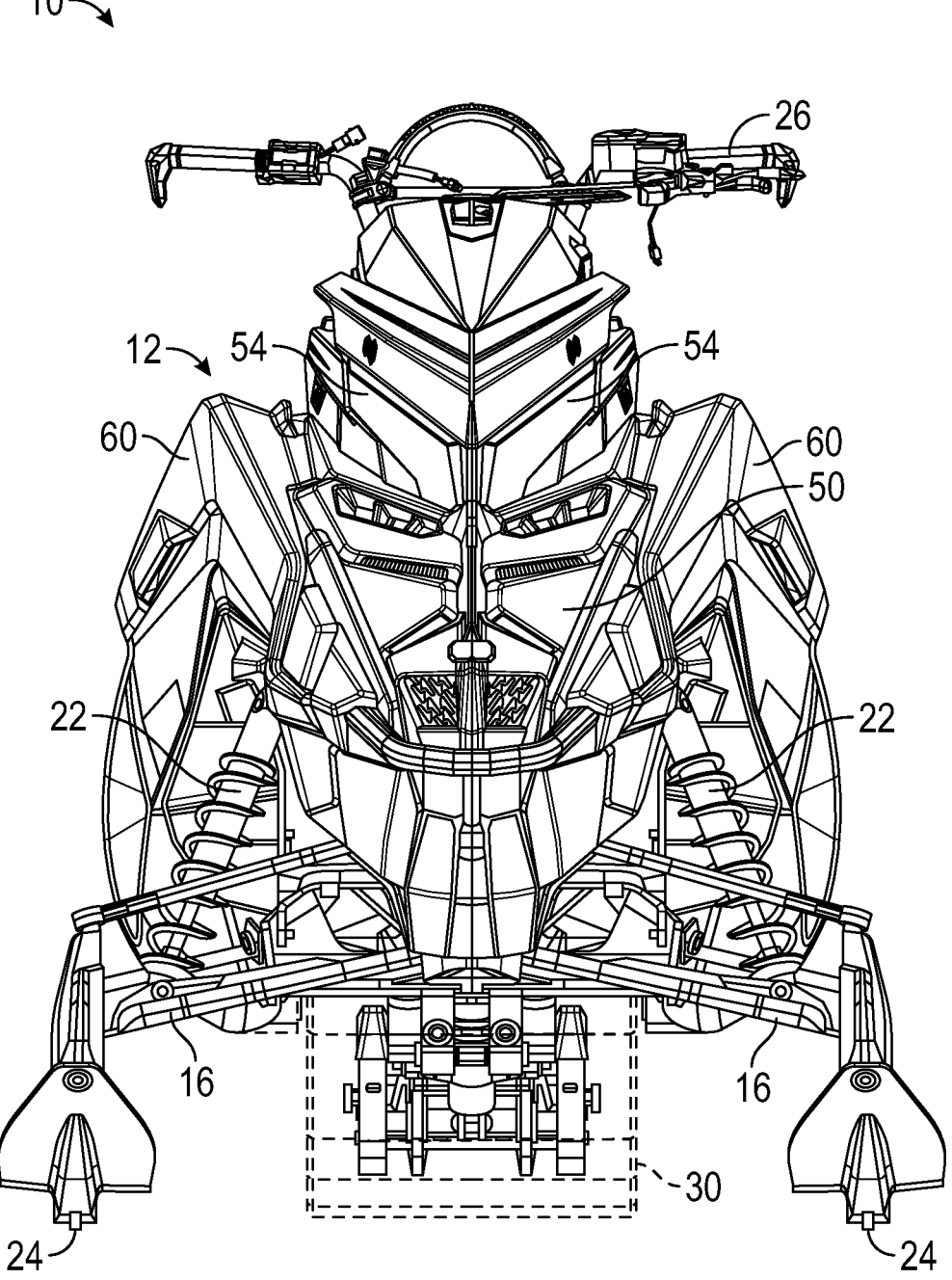
FIG. 1C is a front view of the snowmobile of FIG. 1A.
Figure 1D:
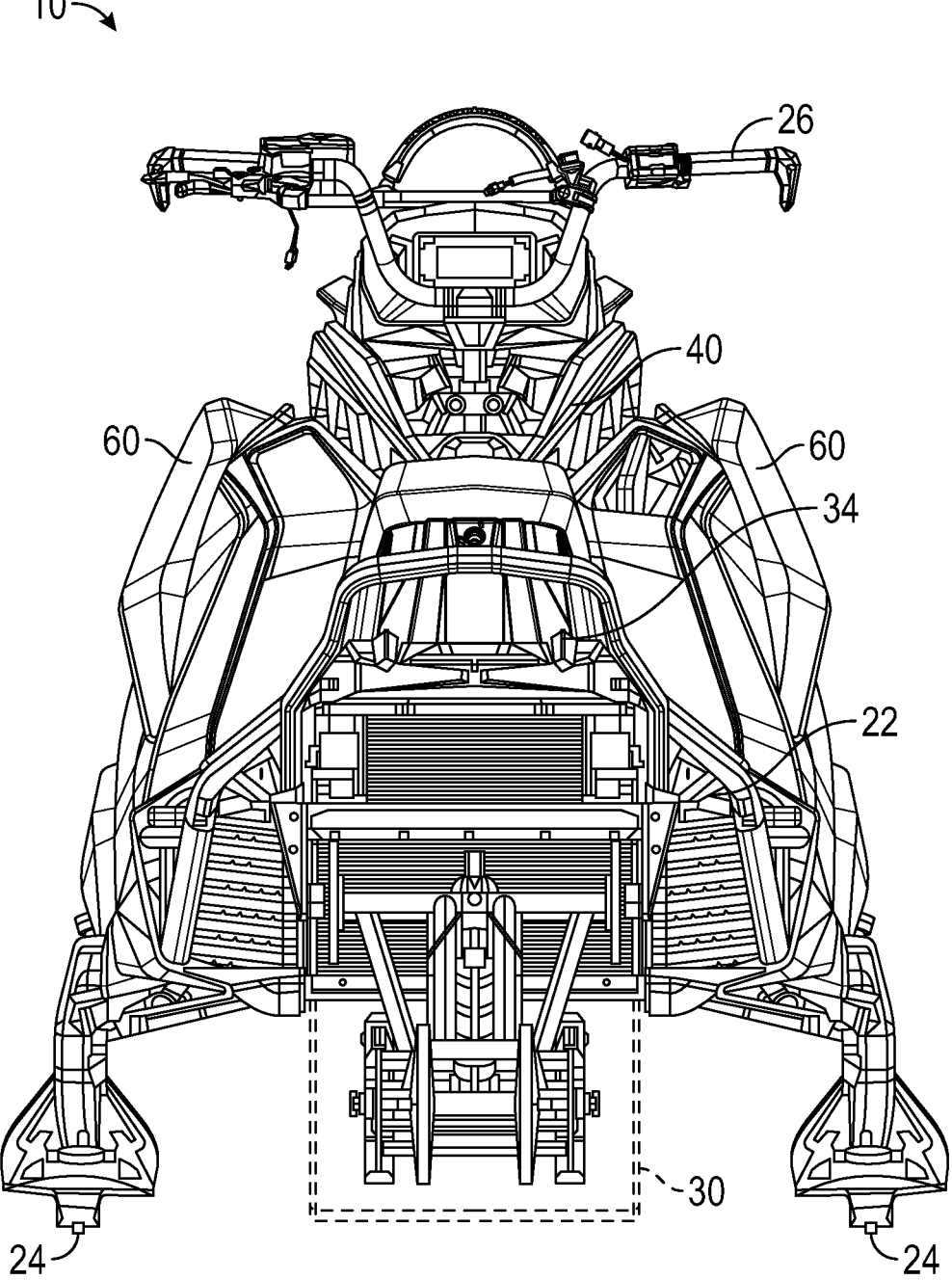
FIG. 1D is a rear view of the snowmobile of FIG. 1A.
Figure 1E:
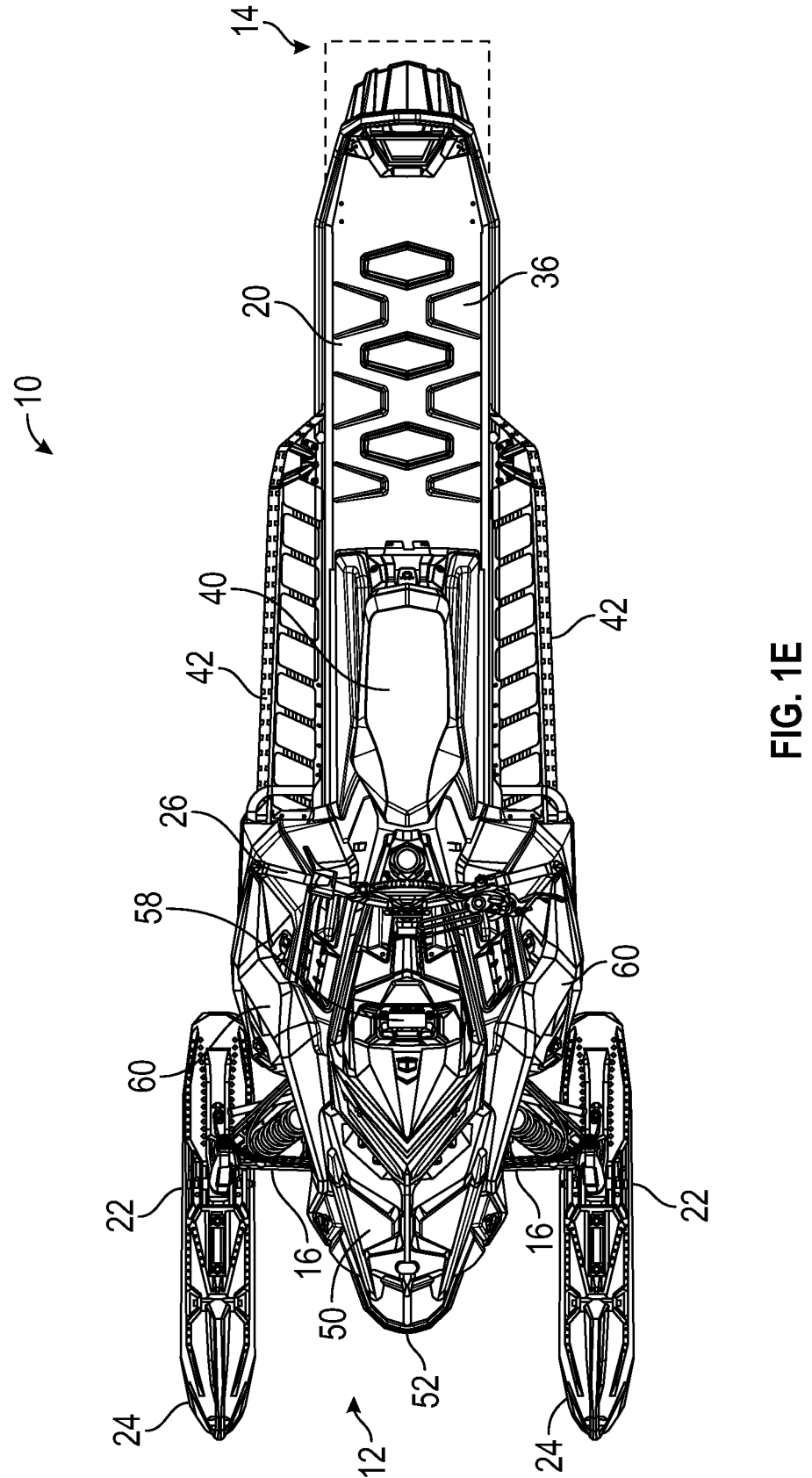
FIG. 1E is a top view of the snowmobile of FIG. 1A.

Example embodiments will now be described more fully with reference to the accompanying drawings.

With initial reference to FIGS. 1A-1F, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18.

The front suspension 16 and the rear suspension 18 support a chassis 20.

The front suspension 16 includes shock absorbers 22, each one of which is connected to a ski 24. The shock absorbers 22 may be any dampening device suitable for absorbing shock resulting from the skis 24 passing over uneven terrain. The skis 24 are steered in part by a suitable steering device, such as handlebars 26. The rear suspension comprises a torque arm 29, Coupled to the rear suspension 18 is a belt or track 30, which is endless or continuous. Rotation of the track 30 propels the snowmobile 10. The track 30 is circulated through a tunnel 32 defined at least in part by the chassis 20 and is positioned by the torque arm 29 that is coupled to the tunnel as will be described in more detail below. The tunnel 32 is tapered at the rear end 14, as described in detail herein. A flap 34 is mounted at the rear end 14 and blocks snow and other debris from being "kicked-up" by the track 30 and to increase the amount of snow in the tunnel for cooling.

A rear tunnel cover 36 extends across the rear of the tunnel 32. The cover 36 extends between longitudinal sidewalls 38A, 38B of the tunnel 32. Longitudinal sidewall 38A is on the left side of the vehicle and longitudinal sidewall 38B is on the right side of the vehicle.

Mounted to the chassis 20 and atop the tunnel 32 is a seat 40 for the operator of the snowmobile 10. On both sides of the chassis 20 or tunnel 32 are running boards 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48.

At the front end 12 of the snowmobile 10 is a hood assembly 50, which is mounted on top of a nose pan 68. Mounted to the hood assembly 50 and protruding from a forward most end thereof, is a front bumper 52. The hood assembly 50 houses headlights 54. An optional windshield 56 is connected to an uppermost portion of the hood assembly 50. Associated with the hood assembly 50 is a display 58 viewable by the operator when seated on the seat 40. Mounted to opposite sides of the hood assembly 50 are body panels 60, which are advantageously interchangeable.

Figure 1F:
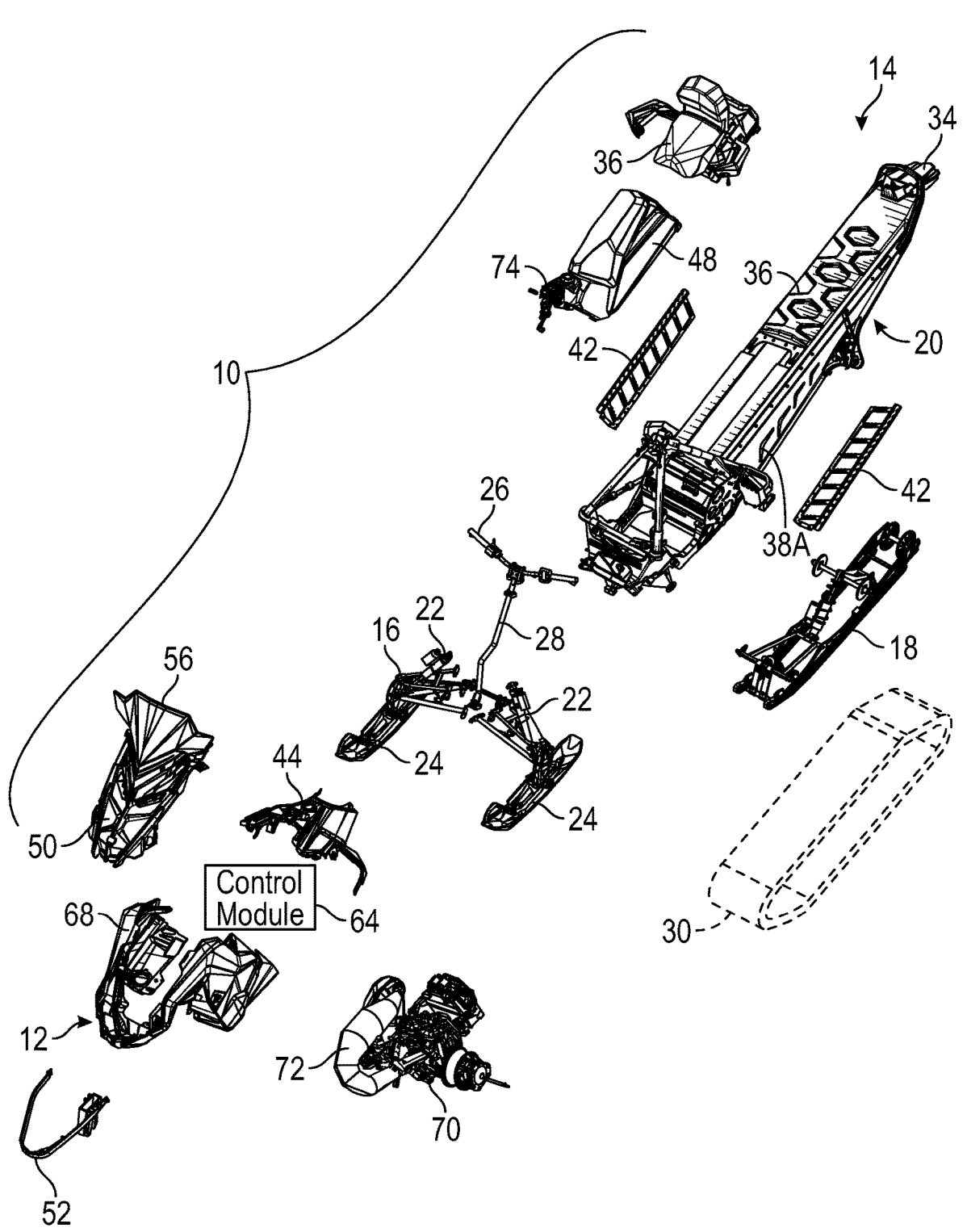
FIG. 1F is an exploded view of the snowmobile of FIG. 1A.

With particular reference to FIG. 1F, the snowmobile 10 further includes an engine assembly 70. The engine assembly 70 generates power for driving the track 30. The engine assembly 70 may include any suitable engine, such as an electric, 2-stroke, and 4-stroke engine. Coupled to the engine assembly 70 is an exhaust assembly 72. Any suitable exhaust assembly may be used. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50, beneath the center console 44, or within any suitable control mounted to the handlebars 26. The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Referring to FIGS. 2A-2G, various views of portions of the snowmobile 10 are illustrated with relevant details set forth therein. Specifically, in FIG. 2A, two thermal covers 202A, 202B are coupled to the sidewalls 38A, 38B, respectively. Thermal cover 202A is on the left side of the vehicle and thermal cover 202B is on the right side of the vehicle. The thermal covers 202A, 202B are formed of a rigid material such as injection molded plastic. The thermal covers 202A, 202B are positioned over respective heat exchangers 204A, 204B. Heat exchanger 204A is disposed on the left side of the vehicle while heat exchanger 204B is disposed on the right side of the vehicle. The lateral extent of the thermal covers 202A, 202B toward the center of the snowmobile 10 is preferably at least as wide as the heat exchangers 204A, 204B. That is, the thermal covers 202A, 202B cover at least a portion of the heat exchangers 204A, 204B longitudinally while laterally covering at least the entire heat exchanger. The heat exchangers 204A, 204B extend laterally from the respective sidewalls 38A, 38B while the thermal covers 202A, 202B extend laterally over the heat exchangers 204A, 204B. In this example, there is a space between the two heat exchangers 204A, 204B and thus the thermal covers 202A, 202B. However, wider heat exchangers may be provided. That is, heat exchangers 204A, 204B may extend across the entire lateral dimension of the tunnel 32.

The thermal covers 202A, 202B may have a thermal layer 203A, 203B of insulation such as an insulating layer or pad respectively disposed on an upper surface thereof. The thermal layer 203A, 203B may extend across most of or all the way across the upper surface of the thermal cover 202A, 202B. The thermal layers 203A, 203B may be integrally formed on the upper surfaces of the thermal covers 202A, 202B or fastened thereto with adhesive, fasteners or the like.

A battery box structure 206 extends across the tunnel 32. The battery box structure 206 may also be fixed to the heat exchanger 204A, 204B on each side thereof. The battery box structure 206, in this example, is sized to be received in a first discontinuous area portion 208 of the thermal cover 202A and a second discontinuous area portion 210 within the thermal cover 202B. That is, the thermal covers 202A, 202B have a continuous width portion 212A, 212B, respectively. A small width portion 208A, 210A are formed in the respective thermal covers 202A, 202B. A smaller width portion 208B, 210B illustrate that the thermal covers 202A, 202B have reduced width further than the widths of the portions 208A, 210A.

The thermal covers 202A, 202B have respective end portions 214A, 214B. The end portions 214A, 214B are located at the rearmost end of the thermal covers 202A, 202B. Each end 214A, 214B may extend about the same width as the portions 208A, 210A. The end portions 214A, 214B have fastener receivers 216A, 216B. The fastener receivers 216A, 216B receive the fasteners 218A, 218B that couple the thermal covers 202A, 202B to the heat exchangers 204A, 204B. In addition, the tunnel cover 36, as illustrated best in FIG. 2A, may be secured to the tunnel 32 using the fasteners 218A, 218B.

At least one of the thermal covers 202A, 202B may have wire clips 220 disposed at least on the continuous width portion 212B. That is, the thermal cover 202B, in this example, has wire clips 220 disposed on the continuous width portion 212B. In this example, seven wire clips 220 are provided. Some of the wire clips 220 are half wire clips are half wire clips while the other wire clips at the ends of the continuous width portion 212B are full wire clips. Half wire clips provide a wire clip arm on one side of the wire 222 while the full wire clips provide wire clip arms on both sides of the wire 222. The wire may be a plurality of wires bundled together to provide electrical and control signals to the forward part of the snowmobile 10. The wire clips 220 assist the assembler to maintain the position of the wire 220 during the assembly process.

The wire clips 220 and the wire 222 secured thereby are received in a channel within the fuel tank 48. The channel 224 extends longitudinally within the fuel tank 48. The channel 224 may be integrally molded to provide enough clearance for both the wire clips 220 and the wire 222. An enlarged view of the channel 224 having the wire clips 220 therein is set forth in FIG. 2G. In this example, the wire has been removed for clarity.

The seat 40 may be coupled to the fuel tank 48 at retainer posts 226. The retainer posts 226 may be integrally formed or molded into the fuel tank 48.

The seal 40 has a seat fastener 40A that is received within a seat support panel 230. The seat support panel 230 covers at least a portion of the battery box structure 206 and has a receiver 230A that receives the seat fastener 40A. Various types of seat fasteners 40A may be used such as a twist lock system that is easily removable to allow access to the battery box structure 206 or the like.

Figure 2A:
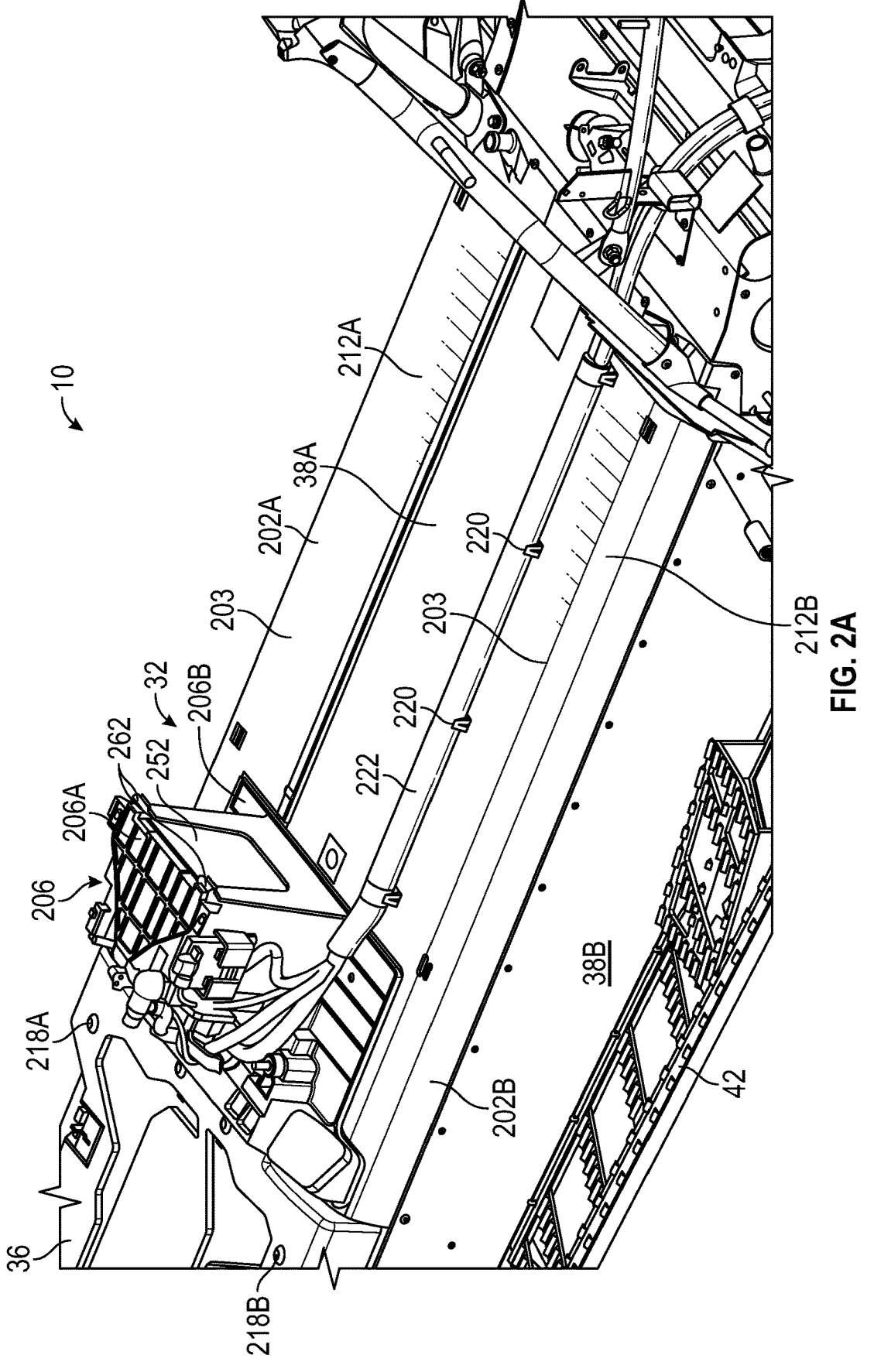
FIG. 2A is a perspective view of the middle of the snowmobile having the thermal covers thereon.
Figure 2B:
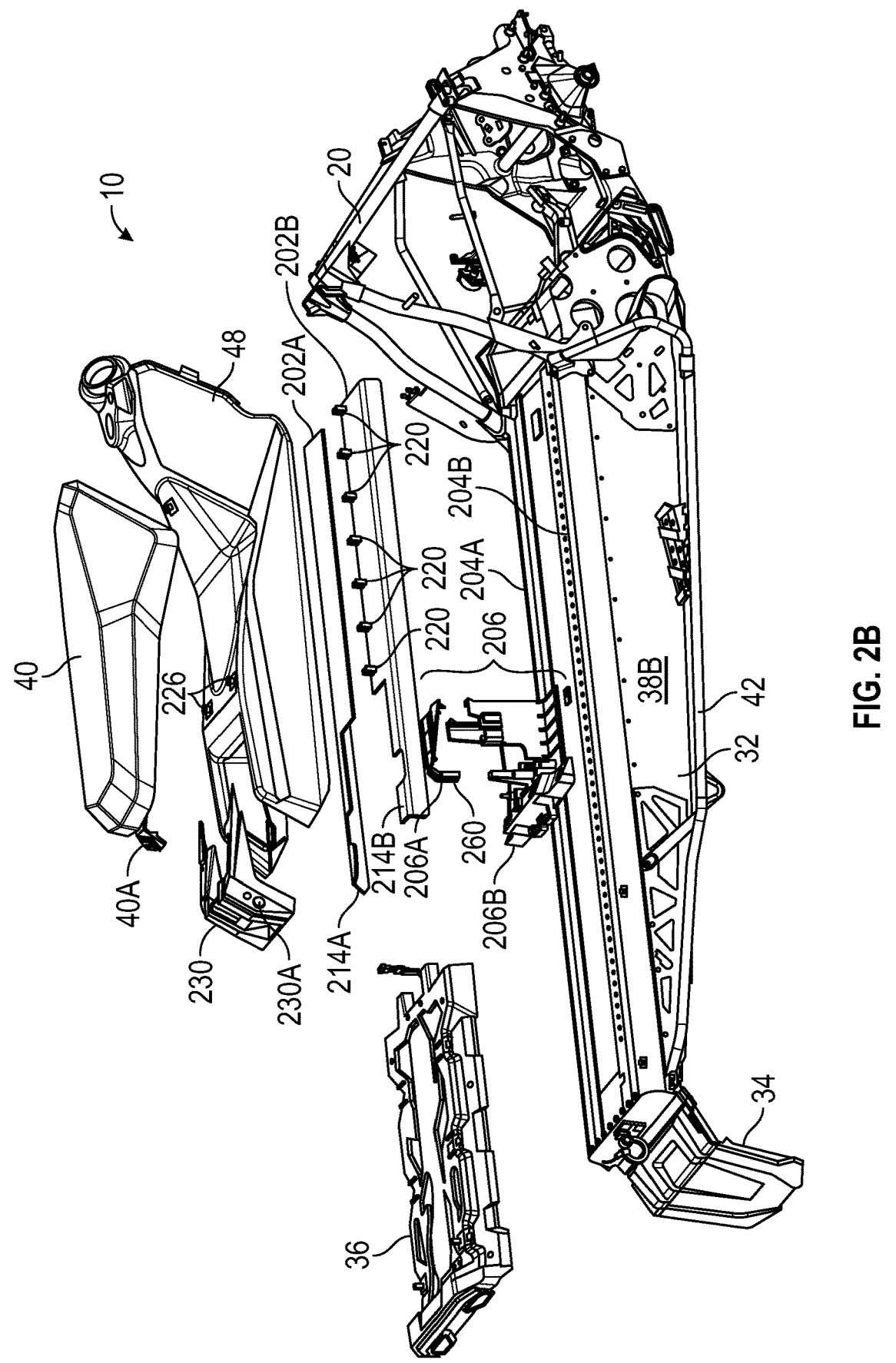
FIG. 2B is a front facing perspective exploded view of the snowmobile.
Figure 2C:
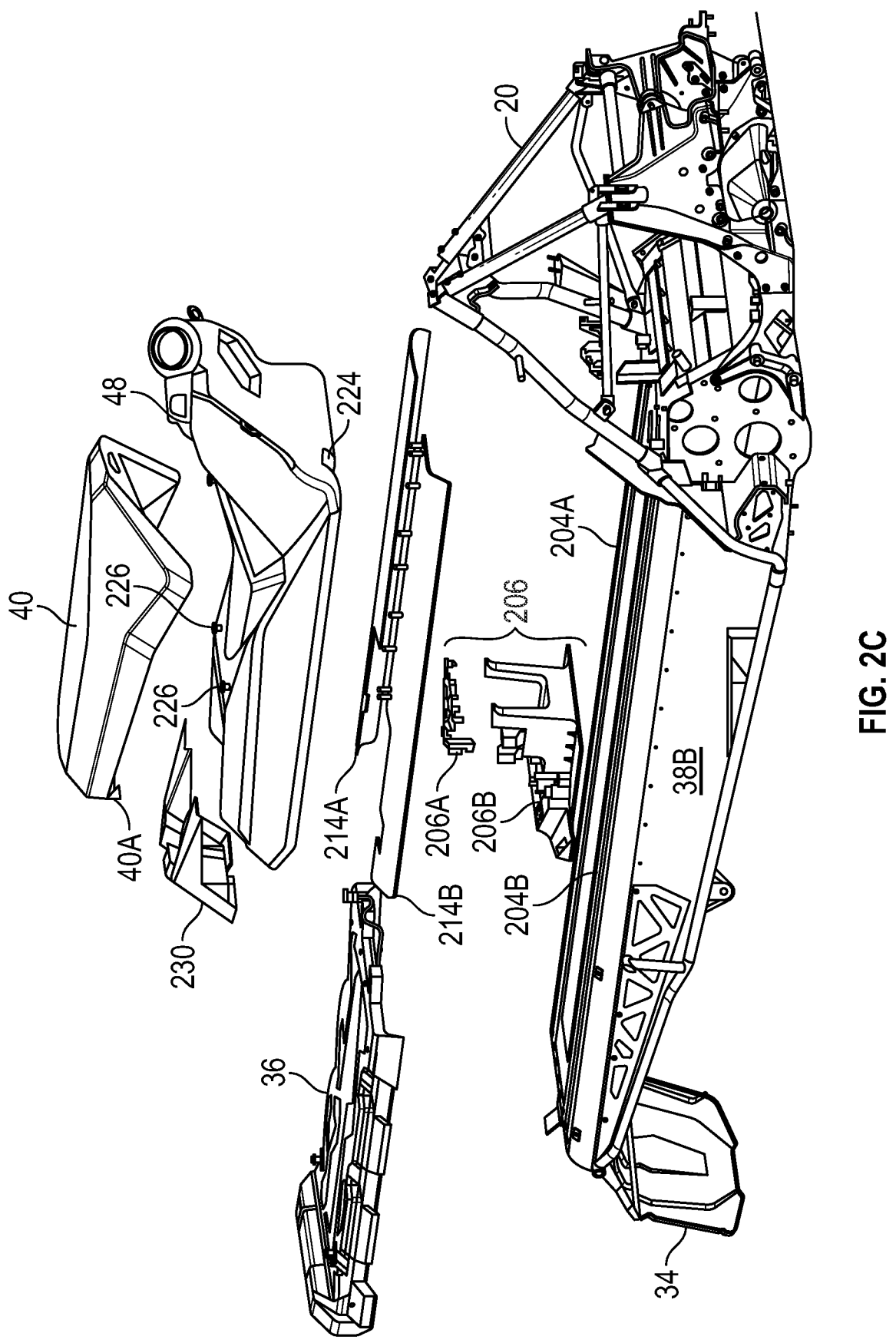
FIG. 2C is a rearward exploded perspective view of the snowmobile.
Figure 2D:
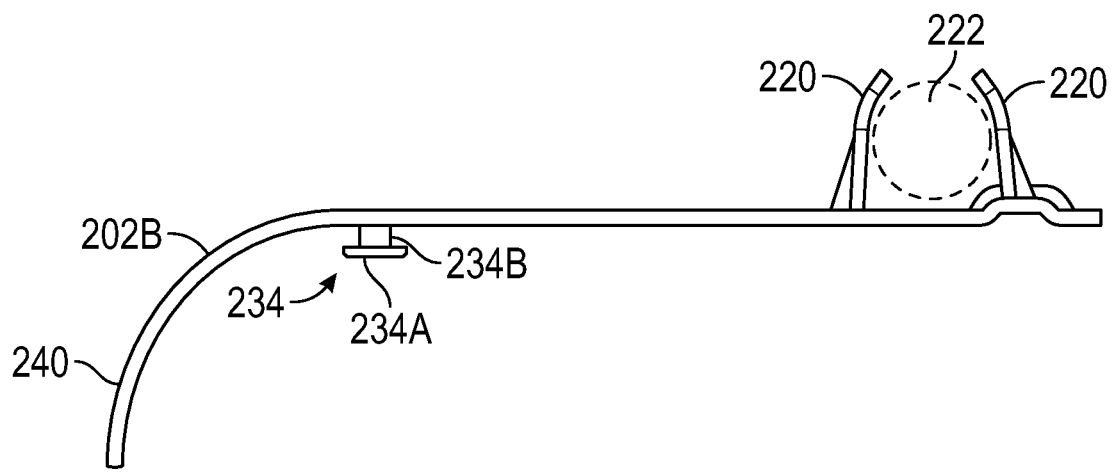
FIG. 2D is a cross-sectional view of a thermal cover.
Figure 2E:
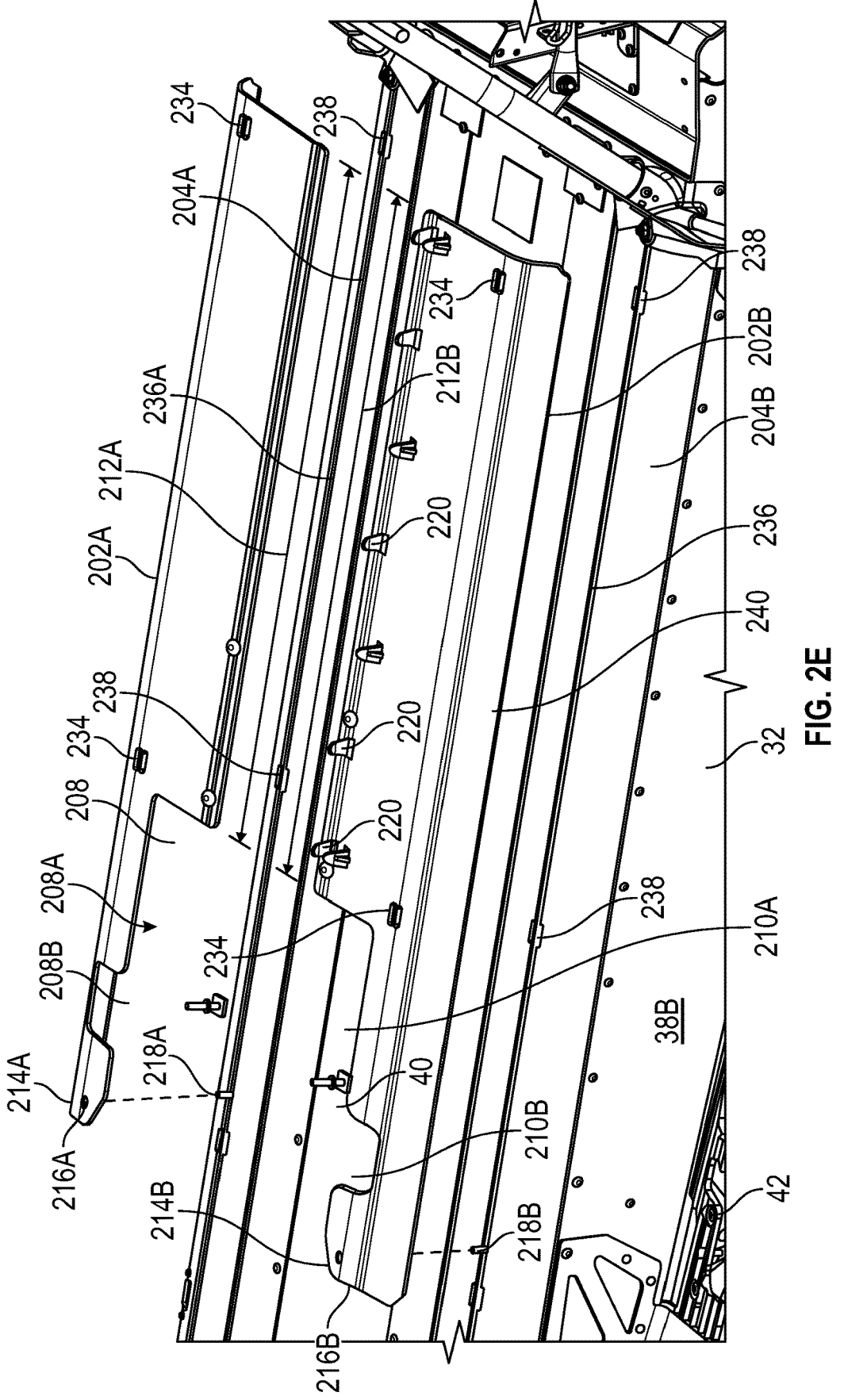
FIG. 2E is a partially exploded perspective view of the thermal covers adjacent to the heat exchangers.

Referring now specifically to FIGS. 2D and 2E, the thermal covers 202A, 202B are secured to the heat exchangers 204A, 204B using an extension or retainer 234 extending from a bottom surface of the respective thermal covers 202A, 202B. The extension or retainer 234 is "T-shaped" and extends in a downward direction from the continuous width portion 212B. In the present example, two retainers 234 are formed on the bottom side of the thermal covers 202A, 202B. A mold formation is illustrated on the top side in FIG. 2E that corresponds to the retainers 234. The retainers 234 may be "T" shaped.

Figure 2F:
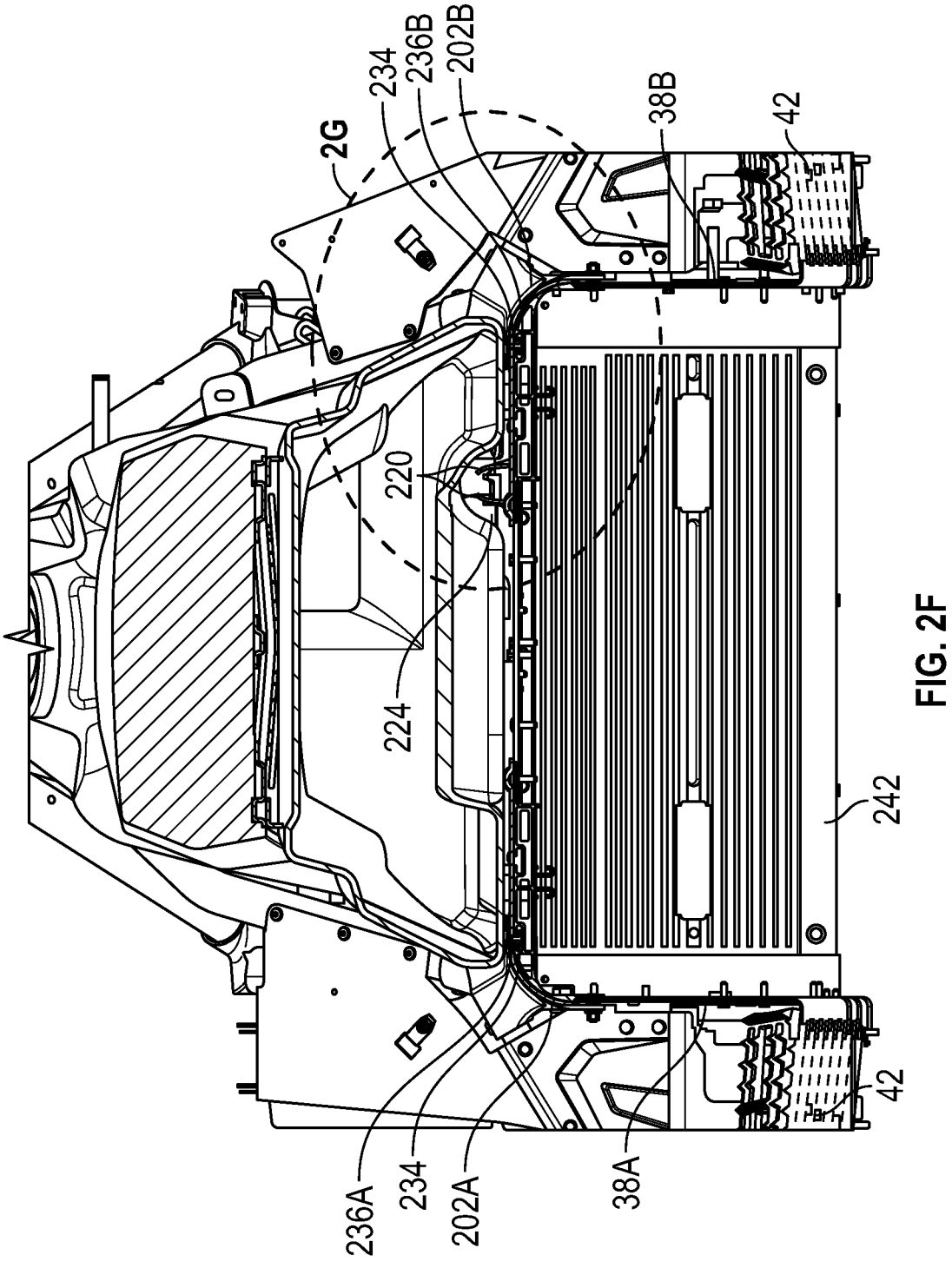
FIG. 2F is a high level cross-sectional view of the tunnel having the thermal covers.
Figure 2G:
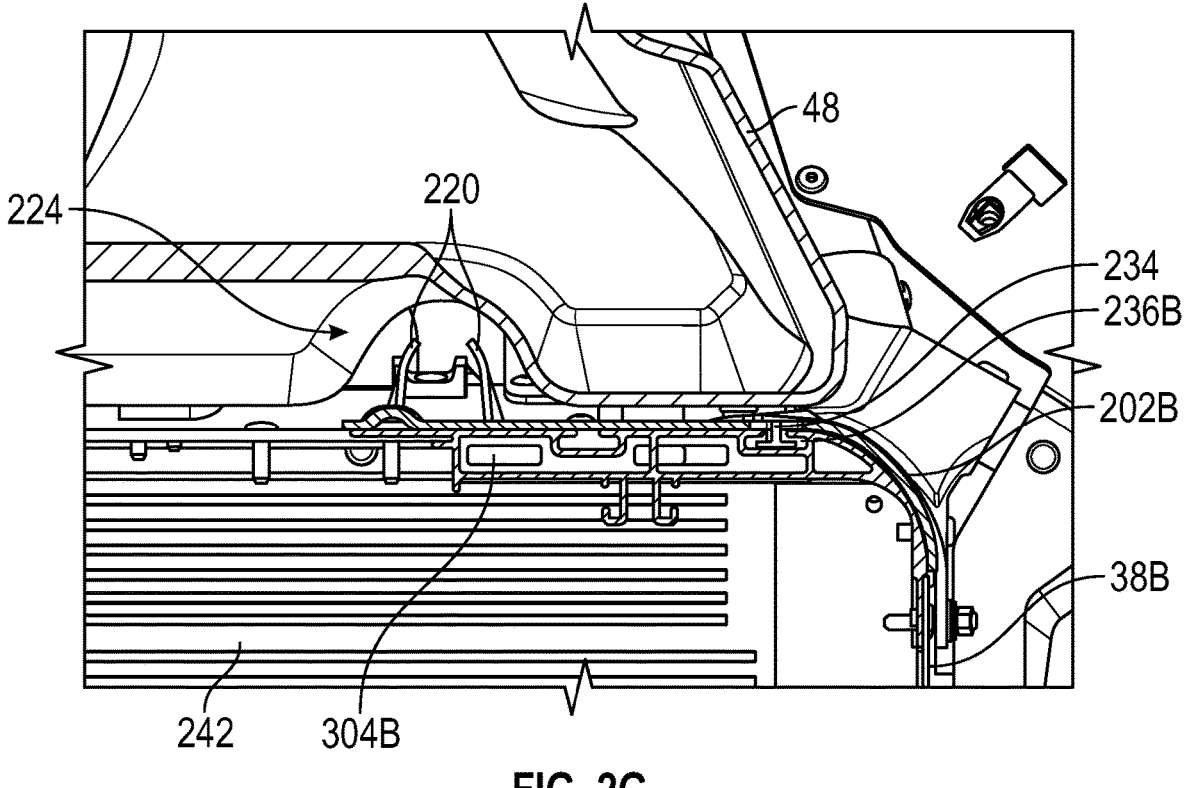
FIG. 2G is a more detailed cross-sectional view than that of FIG. 2F.

Referring now also to FIGS. 2F and 2G, the retainers 234 are received within a channel or T-slot 236A, 236B in an upper-facing side or edge of the respective heat exchangers 204A, 204B. The retainer T-slots 236A, 236B have an extended width area 238 that allows the retainer 234 and the head 234A to be received. The shaft 234B of the retainer 234 is allowed to slide in the width of the channels or T-slots 236A, 236B. During assembly, the retainer head 234A is placed into the extended width area 238A and the entire thermal cover 202A or 202B is slid into the forward direction. The fasteners 218A, 218B secure and maintain the position of the thermal covers 202A, 202B during operation.

The thermal covers 202A, 202B have a curved sidewall 240 that extend in a curved direction and covers the heat exchanger and a curved portion thereof. The heat exchangers 204A, 204B are coupled to the respective sidewalls 38A, 38B to form a structural member. The thermal covers 202A, 202B provide a thermal barrier but do not require the strength of a structural component when placed over the heat exchangers 204A, 204B.

A lateral heat exchanger 242 may extend between the sidewalls 38A, 38B across the tunnel 32. While optional, the lateral heat exchanger is illustrated in FIGS. 2G and 2F.

Referring now to FIGS. 2A, 2B and 3A-3F, details of the battery box structure 206 are illustrated. The battery box 206 has an upper portion 206A and a lower portion 206B. The lower portion 206B has a battery receiver 250. The battery receiver 250 is sized to receive a battery 252 that rests on a floor 253. The battery receiver 250 has vertical walls 254 extending from the floor 253. The vertical walls 254 which, in this example, are located at and form two of the corners. The vertical extending walls 254 may extend around the perimeter of the battery 252 when the battery is installed.

A cover mount 256 may also extend in a vertical direction and is used to secure at least the rear portion of the battery 252 within the battery receiver 250 of the battery box structure 206. The vertical walls 254 may have clips 258 that mount with the upper portion 206A. The upper portion 206A has an extension 260 that may be joined with the cover mount 256 with a fastener. The clips 258 join with a flange 262 to easily join the upper portion 206A to the lower portion 206B. In this example, the flange 262 and the clip 258 may form a hinge so that the upper portion 206A may be rotated relative to the lower portion 206B of the battery box structure 206.

The battery box structure 206 also includes a base 270 that extends laterally from each side of the battery receiver 250. The shape of the base 270 corresponds to the first discontinuous area portion 208 and the second discontinuous area portion 210, mainly the first portion 208A and the second portion 210A. The base 270 has a fastener 272 extending therethrough for fastening the base 270 to the underlying respective heat exchanger.

The lower portion 206B of the battery box structure 206 may also include a solenoid mount 274. In this example, the solenoid mount 274 includes vertical extending posts that are used to receive respective fasteners 276 to hold a solenoid 278 thereto. The solenoid 278 may be used for enabling the coupling of power to various vehicle components with the operation of a key or switch.

The battery receiver 250 may also include a fuse box receiver 280. The fuse box receiver 280 extends laterally from one side of the battery receiver 250. The fuse box receiver 280 receives a fuse box 282 therein when the fuse box receiver 280 may be used to receive various size fuse boxes 282. The fuse box receiver 280 has a first U-shaped wall 280A and second U-shaped wall 280B. A pair of slots 280C extend between the walls 280A, 280B to allow for mechanical attachment and/or electrical attachment to the fuse box 282.

Figure 3A:
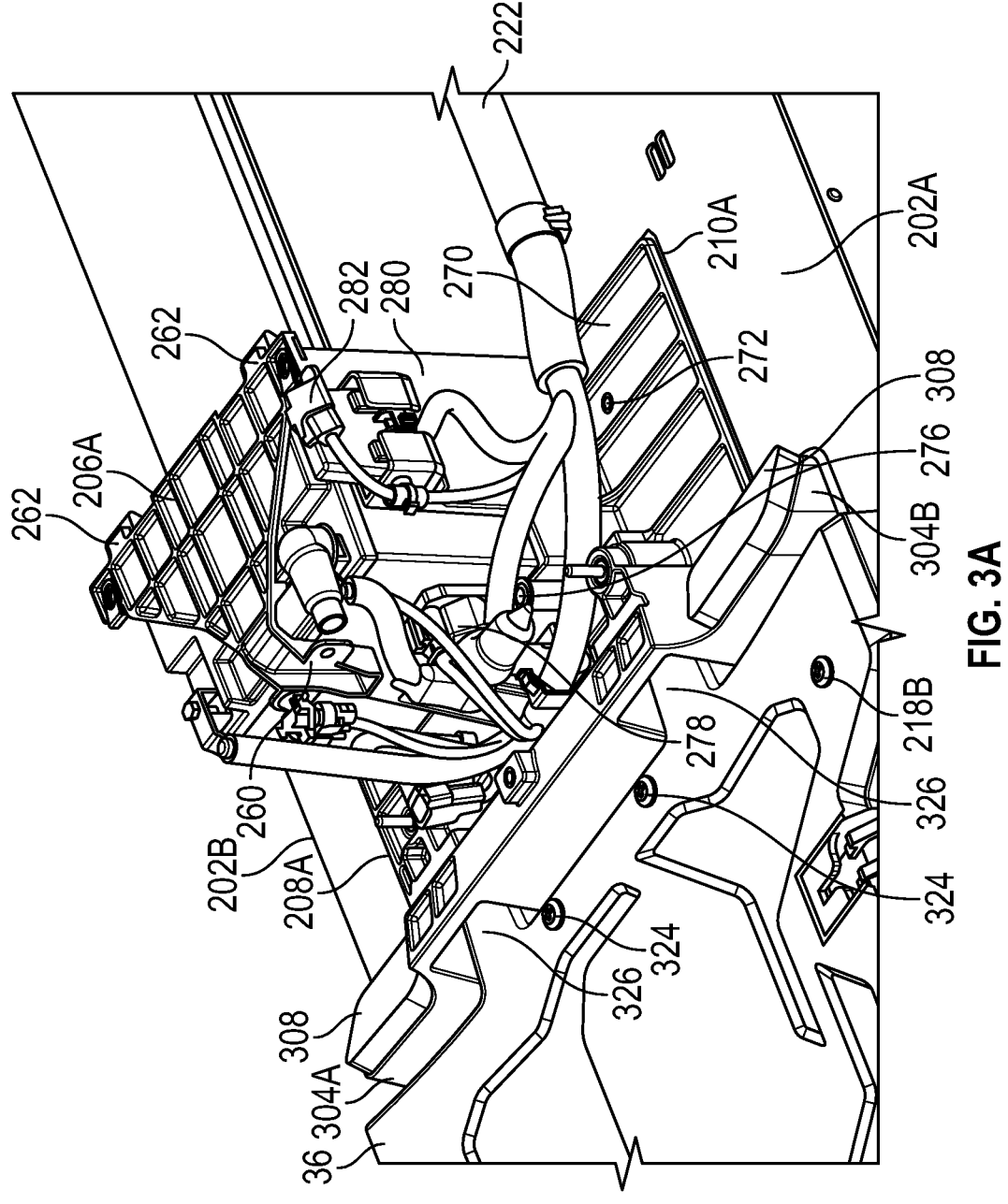
FIG. 3A is a frontward directed perspective view of the battery box structure mounted to the tunnel of the vehicle.
Figure 3B:
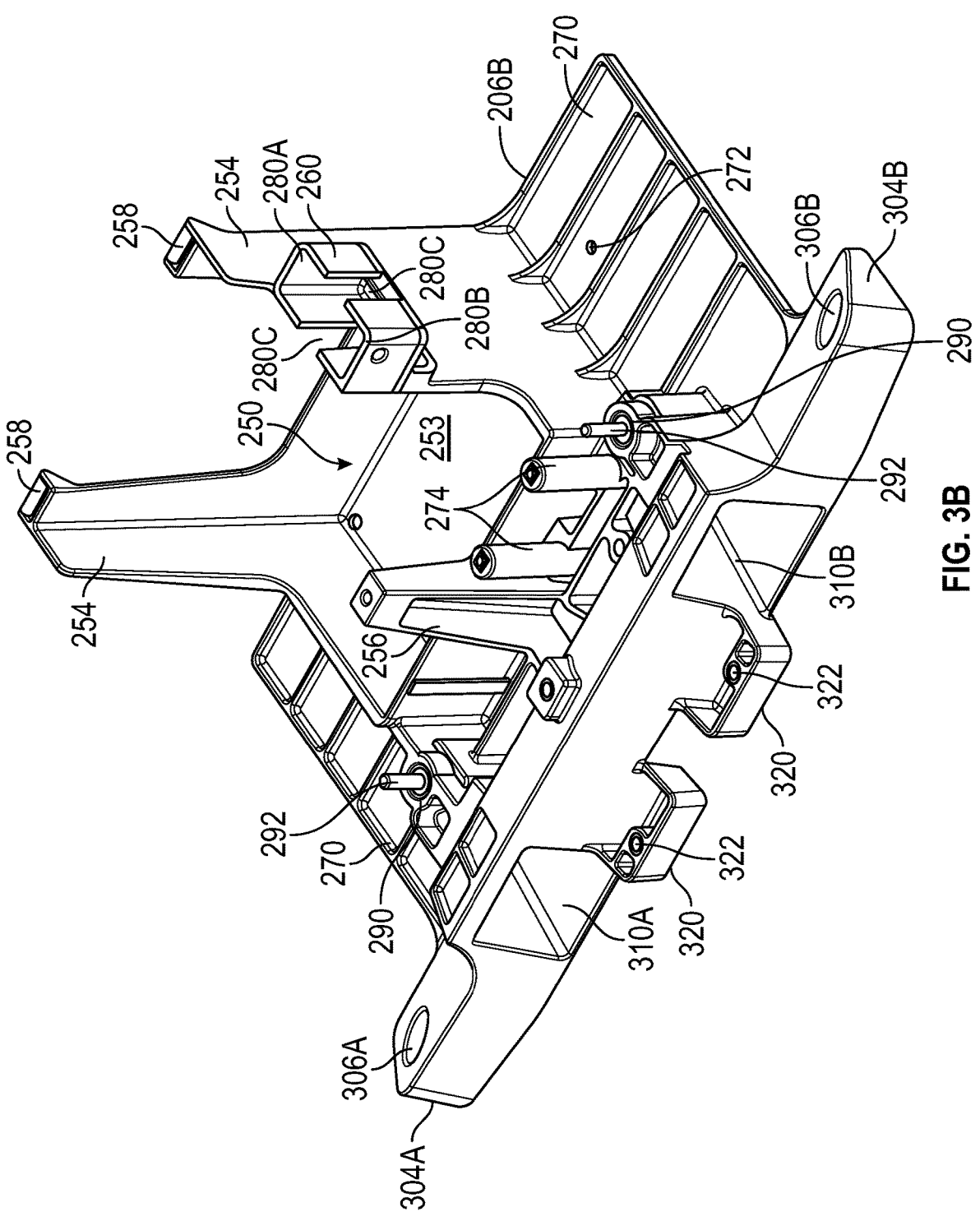
FIG. 3B is a perspective view of the lower portion of the battery box structure.
Figure 3C:
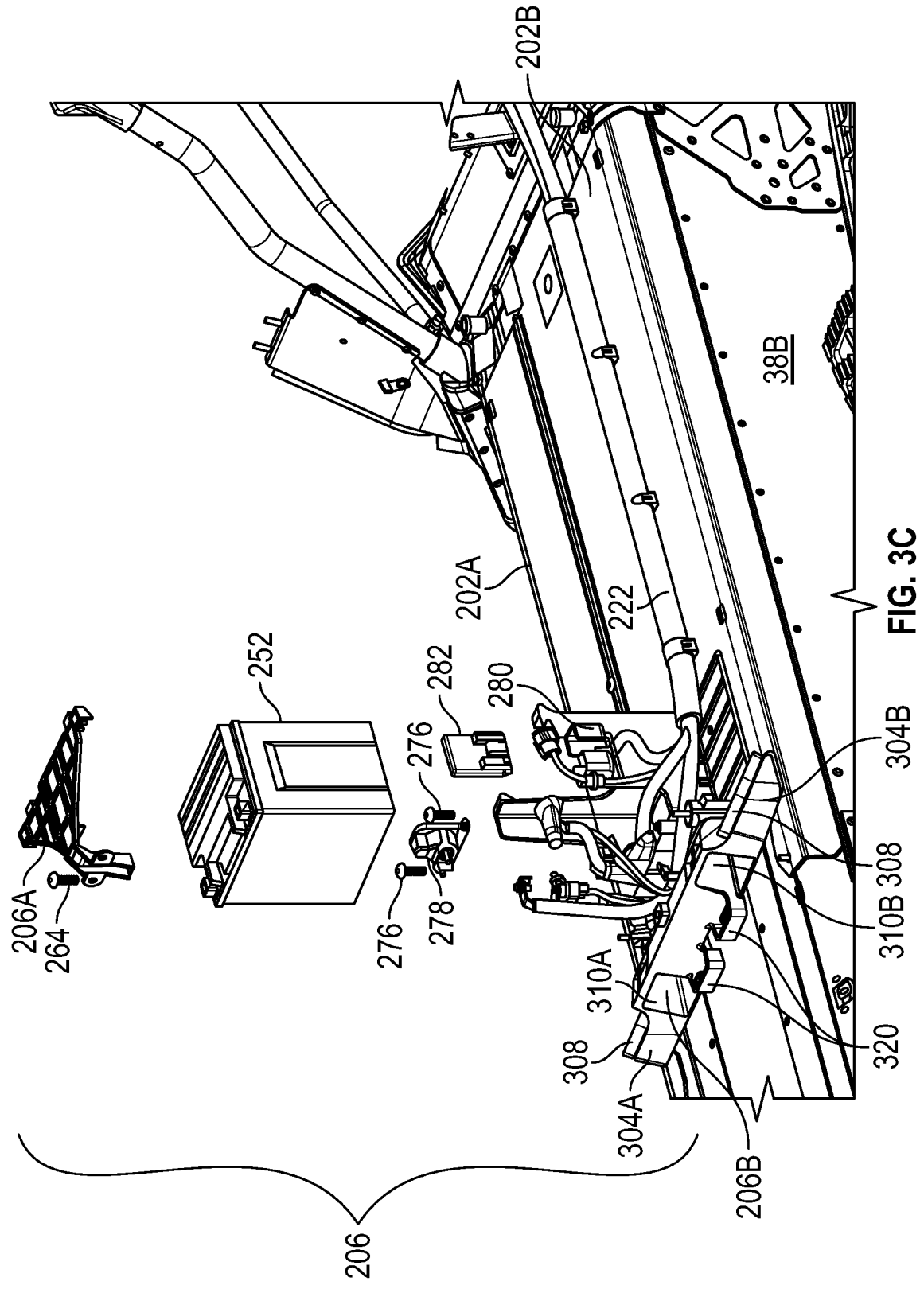
FIG. 3C is a perspective exploded view of the battery box structure with various components exploded therefrom.
Figure 3D:
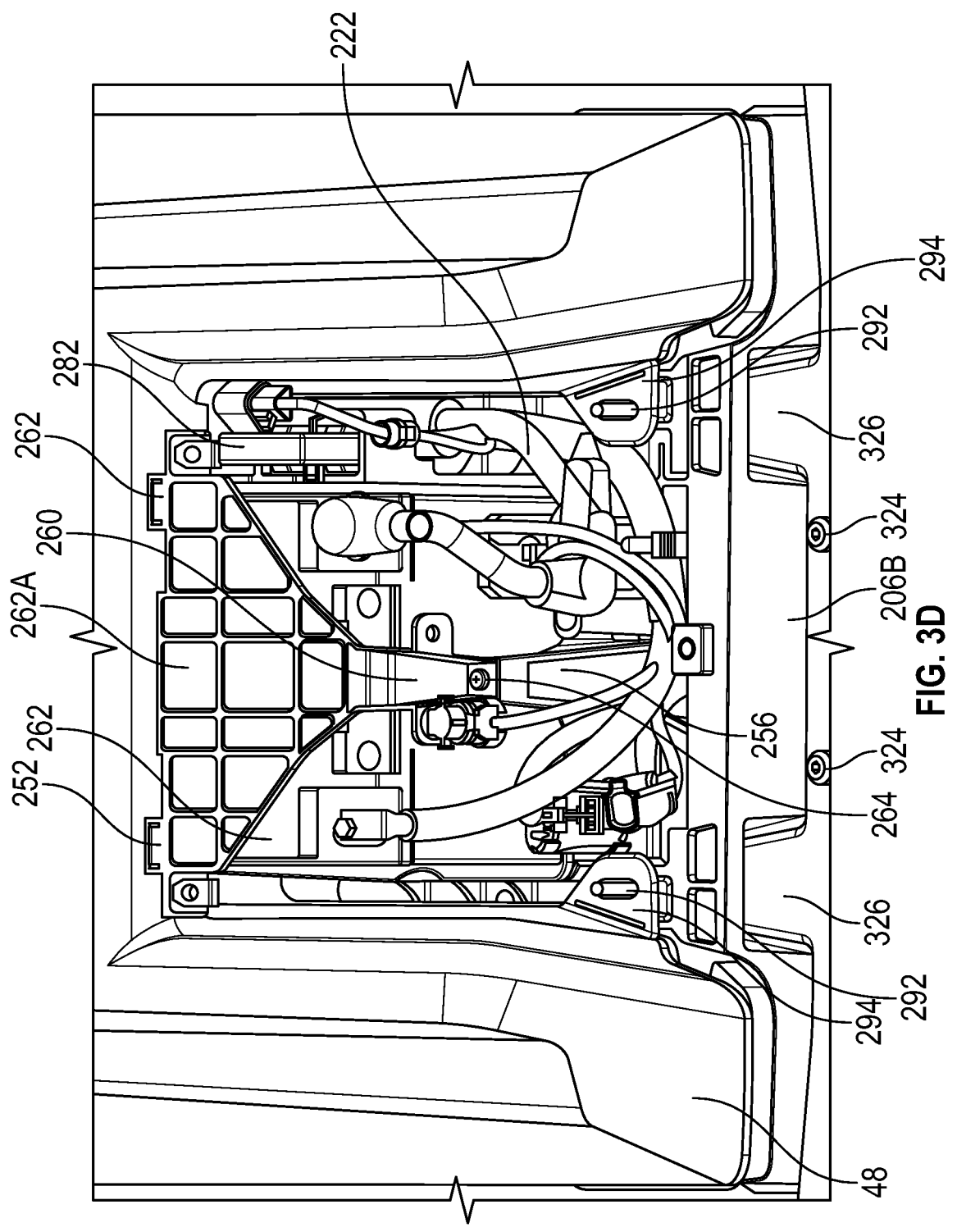
FIG. 3D is a rear view of the battery box structure with the seat support panel removed.
Figure 3E:
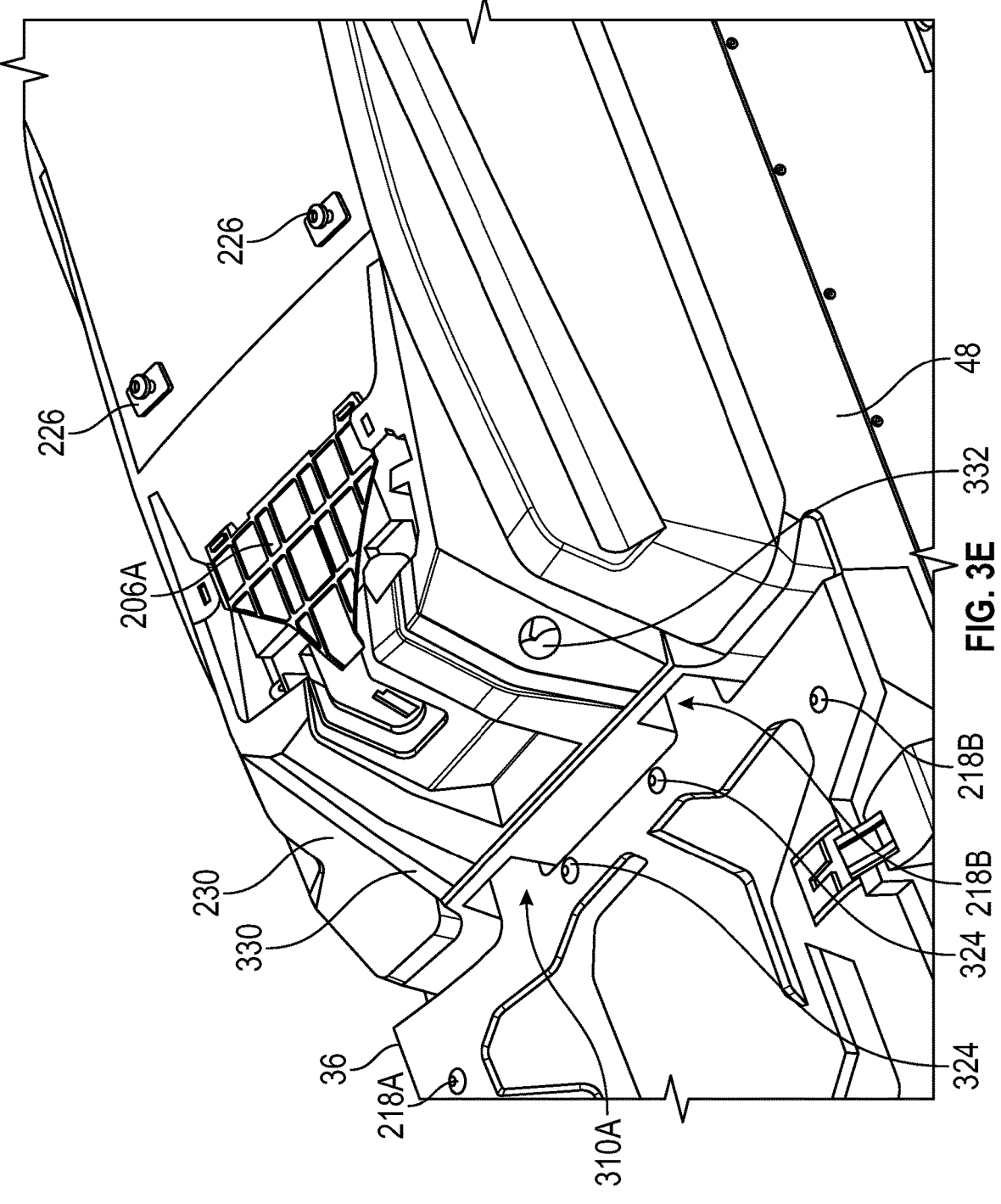
FIG. 3E is a perspective view of the battery box structure having the seat support panel mounted thereon.

The battery box structure 206 may also include a fuel tank mount 290. In this example, two fuel tank mounts 290 are provided behind the battery box receiver. The fuel tank mounts 290 may have an overmolded post 292 for attaching a nut. The post 292 may be threaded to allow for the attachment of an integrally molded flange 294 of the fuel tank 48. This is best illustrated in FIG. 3D. FIG. 3D also shows a fastener 264 that fastens the upper portion 206A of the cover 206 to the cover mount 256.

The base 270 has laterally extending extension 304A, 304B. The laterally extending extensions 304A, 30B have fastener receivers 306A, 306HB for receiving a fastener, such as screw, bolt or ribbon, to fasten the battery box structure 206 to the underlying heat exchangers 204A, 204B. The laterally extending extensions 304A, 304B may have a cushion 308 thereon. The cushion 308 may be positioned between the fuel tank 48 and the battery box structure 206, and more specifically, the laterally extending extensions 304A, 304B.

Figure 3F:
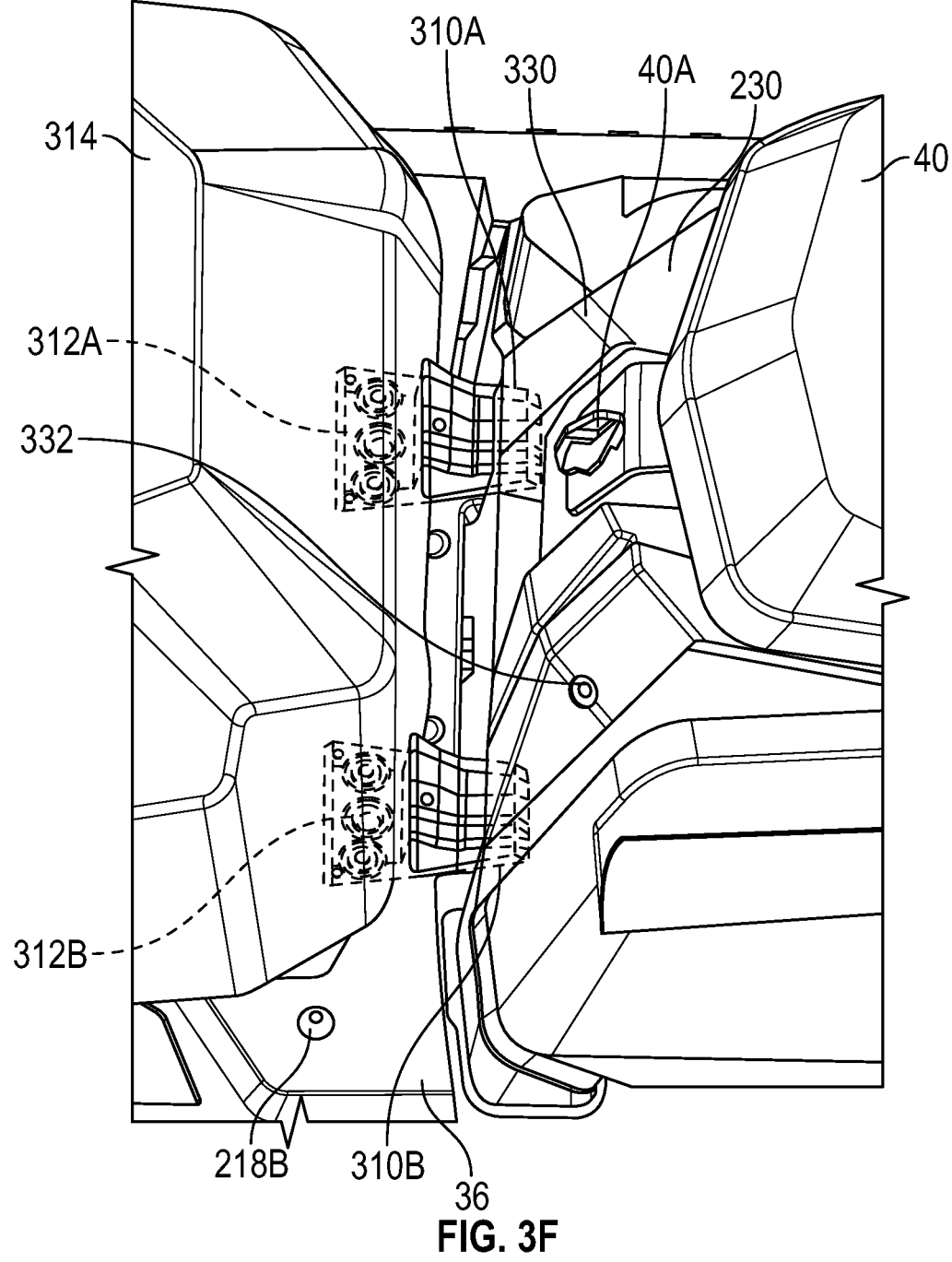
FIG. 3F is a top perspective view of an accessory mounted to the accessory receiver ports.

Accessory receiver ports 310A, 310B are formed within the battery box structure 206. The accessory receiver ports 310A, 310B are, in this example, rectangular in shape. However, other shapes may be used. The accessory receiver port 310A, 310B are used for receiving an accessory mount 312A, 312B as best illustrated in FIG. 3F. In FIG. 3F, an accessory 314 has the accessory mounts 312A, 312B extending therefrom allowing the accessory to be mounted to the battery box. The accessory receiver ports 310A, 310B prevent vertical and lateral movement of the accessory 314. Various types of accessories 314 may be provided, such as a rear passenger seat, utility racks and the like. Of course, other means for preventing the longitudinal movement of the accessory 314, such as bolt, screw, strap, or the like, may be provided on the accessory.

The battery box structure 206 may also include rearwardly extending flanges 320. In this example, two rearwardly extending flanges 320 extend rearwardly from positions between the accessory receiver ports 310A, 310B. The rearwardly extending flanges 320A have fastener receivers 322. The fastener receivers are used to receive a fastener as is best illustrated in FIG. 3A. The fasteners 324 may be used to secure the cover 36 to the rearwardly extending flanges 320 that extend beneath the cover 36. That is, the cover 36 is disposed above the rearwardly extending flanges 320. As is best illustrated in FIG. 3A, finger portion of the cover 36 extends into the accessory receiver ports 310A, 310B.

The wire 222, as mentioned above, may be plurality of bundled wires and form a bust. The wires 222 may extend to the fuse box 282, the solenoid 278 and the battery. The wires 222 are positioned to be removed so that the battery 252 can be replaced or removed for charging during extended non-use.

The rear seat support panel 230, in this example, is sized to cover the post 292 that mount the fuel tank thereto. The seat support panel 230 is also used to cover the electric connections at the battery box structure 206. An accessory power port 330 may also be disposed within the seat support panel 230. The accessory power port 330 may provide charging for various accessories or for powering various accessories used in the snowmobile 10.

A battery tender port 332, port 232 may provide an electrical connection for a battery tender to be used to maintain the battery during extended periods of non-use of the vehicle. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a tunnel covering at least a portion of an endless track, said tunnel comprising a first sidewall and a second sidewall extending longitudinally relative to the vehicle;
a first heat exchanger coupled to the first sidewall;
a fuel tank;
a first thermal cover coupled to the first heat exchanger between the first heat exchanger and the fuel tank; and
a first insulating layer disposed on an upper surface of the first thermal cover.

2. The vehicle of claim 1 wherein the first heat exchanger comprises a first T-slot therein.

3. The vehicle of claim 2 wherein a lower surface of the first thermal cover comprises a first T-extension received within the first T-slot.

4. The vehicle of claim 3 wherein the first T-slot is disposed in an upper-facing edge of the first heat exchanger.

5. The vehicle of claim 1 further comprising a second heat exchanger coupled to a second sidewall and a second thermal cover coupled to the second heat exchanger between the second heat exchanger and the fuel tank; and
a second insulating layer disposed on an upper surface of the second thermal cover;
a second heat exchanger coupled to the second sidewall.

6. The vehicle of claim 5 wherein the first thermal cover and the second thermal cover are rigid.

7. The vehicle of claim 5 wherein the second heat exchanger comprises a second T-slot therein.

8. The vehicle of claim 7 wherein the second T-slot is disposed in an upper-facing edge of the second heat exchanger.

9. The vehicle of claim 8 wherein a lower surface of the second thermal cover comprises a second T-extension received within the second T-slot.

10. The vehicle of claim 5 wherein the first thermal cover comprises an inside edge comprising a first discontinuous area portion and the second thermal cover comprises a second discontinuous area portion, wherein the first discontinuous area portion and the second discontinuous area portion are sized to receive at least a portion of a battery box structure, said battery box structure coupled to and between the first sidewall and the second sidewall.

11. The vehicle of claim 5 wherein the first thermal cover comprises a first rearward end comprising a first fastener receiver and the second thermal cover comprises a second rearward end comprising a second fastener receiver, and further comprising a first fastener coupling the first rearward end and a tunnel cover to the first heat exchanger and a second fastener coupling the second rearward end and the tunnel cover to the second heat exchanger.

12. The vehicle of claim 1 further comprising a wire clip integrally formed in the upper surface of the first thermal cover.

13. The vehicle of claim 12 wherein the wire clip comprises an electrical wire coupled thereto, and wherein the fuel tank comprises a lower surface comprising a longitudinally extending channel receiving the electrical wire at least partially therein.

14. A vehicle having a battery comprising
    a tunnel covering at least a portion of an endless track, said tunnel comprising a first sidewall and a second sidewall extending longitudinally relative to the vehicle;
    a fuel tank;
    a battery box structure coupled between the first sidewall and the second sidewall comprising a battery receiver receiving the battery therein; and
    a fuel tank mount integrally formed in the battery box structure coupling the battery box to the fuel tank.

15. The vehicle of claim 14 further comprising a first heat exchanger coupled to the first sidewall, a second heat exchanger coupled to the second sidewall and wherein the battery box structure is coupled to the first sidewall and the second sidewall by the first heat exchanger and second heat exchanger.

16. The vehicle of claim 15 wherein the battery box structure comprises a base extending outward from the battery receiver coupled to the first heat exchanger and the second heat exchanger.

17. The vehicle of claim 14 wherein said fuel tank comprises a flange coupled to the fuel tank mount.

18. The vehicle of claim 17 wherein the fuel tank mount comprises a first fuel tank mount and a second fuel tank mount, wherein the flange comprises a first flange coupled to the first fuel tank mount and a second flange coupled to the second fuel tank mount.

19. The vehicle of claim 14 further comprising a solenoid mount integrally formed into the battery box, said solenoid mount receiving a solenoid therein.

20. The vehicle of claim 19 wherein the solenoid mount extends from a longitudinally extending wall of the battery receiver.

21. The vehicle of claim 14 further comprising a fuse box receiver is integrally formed in the battery box structure.

22. The vehicle of claim 21 wherein the fuse box receiver is integrally formed with the battery receiver.

23. The vehicle of claim 14 further comprising a seat support panel coupled to the battery box structure, wherein the fuel tank has retainer posts extending therefrom, said retainer posts and said seat support coupling a seat to the tunnel.

24. The vehicle of claim 23 further comprising a port coupled to the seat support panel.

25. The vehicle of claim 14 further comprising a rear tunnel cover and wherein the battery box structure comprises flanges extending beneath and fastened to the rear tunnel cover.

26. The vehicle of claim 14 wherein the battery box structure comprises an accessory receiver port integrally formed therein.

27. A vehicle comprising a battery comprising:
    a tunnel covering at least a portion of an endless track, said tunnel comprising a first sidewall and a second sidewall extending longitudinally relative to the vehicle;
    a first heat exchanger coupled to the first sidewall;
    a second heat exchanger coupled to the second sidewall;
    a fuel tank;
    a first thermal cover coupled to the first heat exchanger between the first heat exchanger and the fuel tank;
    a first insulating layer disposed on an upper surface of the first thermal cover;
    a second thermal cover coupled to the second heat exchanger between the second heat exchanger and the fuel tank; and
    a second insulating layer disposed on an upper surface of the second thermal cover.

28. The vehicle of claim 27 further comprising a battery box structure coupled to the first heat exchanger and the second heat exchanger between the first sidewall and the second sidewall, said battery box structure comprising a battery receiver receiving the battery therein.

29. The vehicle of claim 28 further comprising a fuel tank mount integrally formed in the battery box structure coupling the battery box to the fuel tank.

* * * * *